United States Patent
Wu

(10) Patent No.: US 6,760,813 B1
(45) Date of Patent: Jul. 6, 2004

(54) DEVICES, SOFTWARES AND METHODS FOR PREEMPTIVELY UPDATING EXPIRING ENTRIES IN A CACHE MEMORY TO ANTICIPATE FUTURE INQUIRIES

(75) Inventor: Yuguang Wu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 49 days.

(21) Appl. No.: 10/032,193

(22) Filed: Dec. 20, 2001

(51) Int. Cl.[7] .............................................. G06F 12/12
(52) U.S. Cl. ..................... 711/133; 711/106; 711/113; 711/118; 711/135; 711/151; 711/158; 711/159; 711/167; 707/3; 709/240; 709/242; 710/244
(58) Field of Search ................................. 711/133, 167, 711/118, 158, 159, 106, 113, 135, 151; 709/242, 240; 707/3; 710/244

(56) References Cited

U.S. PATENT DOCUMENTS

| | | | | |
|---|---|---|---|---|
| 6,167,436 A | * | 12/2000 | Yamane et al. | 709/213 |
| 6,298,343 B1 | * | 10/2001 | Chang et al. | 707/5 |
| 6,532,490 B1 | * | 3/2003 | Lewis et al. | 709/217 |
| 2002/0116583 A1 | * | 8/2002 | Copeland et al. | 711/133 |

* cited by examiner

Primary Examiner—Mano Padmanabhan
Assistant Examiner—Jasmine Song
(74) Attorney, Agent, or Firm—Marger Johnson & McCollom, PC

(57) ABSTRACT

Devices, softwares and methods update preemptively entries in a cache memory that are expiring. Updating takes place at scheduled refresh times. Refresh times are computed from usage history data and change history data that is maintained and tracked for each entry. This way a frequently made inquiry will be fulfilled with an entry that has been refreshed preemptively in advance, even after its original expiration time.

24 Claims, 8 Drawing Sheets

DEVICES, SOFTWARES AND METHODS FOR PREEMPTIVELY UPDATING EXPIRING ENTRIES IN A CACHE MEMORY TO ANTICIPATE FUTURE INQUIRIES

BACKGROUND OF THE INVENTION

1. Field of the Invention

The present invention is related to the field of communications via networks, and more specifically to devices, softwares and methods for preemptively updating expiring entries in a cache memory, to anticipate future inquiries for these entries.

2. Description of the Related Art

In network communications, data is propagated from a source device to a destination device along a path in the network. The path is a series of nodes of the network. Each node has an electronic address that the data is forwarded to, as it is moving along the path. The electronic addresses of the nodes are stored in special devices, such as network servers.

Paths are regularly reconfigured to be through different nodes. This occurs for various reasons, such as to deal with changing network conditions. With reconfiguring, no path is expected to remain recommended indefinitely. In fact, each electronic address is typically provided with its own expiration time (T0). After the expiration time (T0), also called timeout time, the address is not necessarily reliable, and is frequently deleted.

When an inquiry is received for an electronic address, it is first determined if it is in the cache. If so, then its expiration time (T0) is compared against the current time. If it has not expired yet, then it is furnished as a reply. If it has expired, the inquiry is placed on hold, and then an updated entry is sought.

The process has problems. Seeking the updated entry takes a long time, while a transmission is waiting. This problem will be described in more detail, after describing the prior art process more analytically.

Referring now to FIG. 1, a flowchart 100 is used to illustrate the practice of the prior art. It will be appreciated that flowchart 100 helps describe the process from an event-driven point of view.

According to a box 110, it is inquired whether an item is received. If not, then according to a next box 120, it is inquired whether any entries in a cache memory have expired. This would be known if their expiration time T0 is less than the current time. If not, then execution reverts to box 110. If yes, then according to a next box 125, the expired entries are deleted, and execution again reverts to box 110.

If, in box 110, an item has indeed been received, then according to a next box 140, it is inquired whether the item is an inquiry for an address. If not, then according to a next box 150, it is inquired whether instead the item is a reply to a request. If not, then according to a next box 160, the item is processed otherwise, and execution reverts to box 110.

If, in box 140, the item is indeed an inquiry for an address, then the inquiry is processed. Processing the inquiry is described in more detail later, with reference to flowchart 200 of FIG. 2. Execution then reverts back to box 110.

If, in box 150, the item is indeed a reply to a request, then the reply is processed. Processing the reply is described in more detail later, with reference to flowchart 300 of FIG. 3. Execution then reverts back to box 110.

Referring now to FIG. 2, a flowchart 200 is used to illustrate how the inquiry is processed after box 140 of FIG. 1 in the prior art.

According to a box 210, it is inquired whether the inquired for entry is already in the cache memory. It may have been, from fulfilling a prior entry, and it might not have been discarded yet at box 125 of FIG. 1.

If the entry is already in the cache memory, then according to a next box 240, it is inquired whether it is still valid, i.e. not expired. In other words, it is inquired whether its expiration time T0 is larger than the current time. If yes, then according to a next box 250, the inquiry is fulfilled by responding to it with the entry.

If the entry is not in the cache memory (NO, from box 210), or it has timed out (NO, from box 240), then according to a next box 260, a request is formed based on the inquiry, for an updated value of the item. According to a next box 270, the formed request is transmitted, and according to a next box 280, the inquiry is placed on hold.

Referring now to FIG. 3, a flowchart 300 is used to illustrate how the inquiry is processed after box 350 of FIG. 1 in the prior art.

According to a box 310, the received item is stored in the cache memory.

According to a next box 320, its timeout value T0 is determined.

According to a next box 360, the inquiry that generated the request is identified. Generation would be at a prior time, at box 260 of FIG. 2.

According to a next box 370, the item is forwarded to the maker of the inquiry.

The problem in the prior art is that it often takes a long time to receive at box 310 a reply to the request generated at box 260 of FIG. 2. During that time, the inquiry is on hold, which slows down the network.

BRIEF SUMMARY OF THE INVENTION

The present invention overcomes these problems and limitations of the prior art.

Generally, the present invention provides devices, softwares and methods for preemptively updating entries in a cache memory that are expiring. This anticipates future inquiries for the entries, even after they expire.

In an embodiment of the invention, preemptive updating takes place at a scheduled refresh time after expiration. Refresh times are preferably scheduled on an individual basis, in accordance with when the future inquiry is expected to happen. Additional data is preferably maintained for each entry, such as a usage history and a change history. The additional data are used in computing an individualized refresh time for updating.

The invention offers the advantage that a frequently made inquiry will be fulfilled with an entry that has been refreshed preemptively in advance, even after its original expiration time. There will be no need to go out to find the updated answer, while keeping the inquiry on hold. This prevents time from being wasted in waiting for an update, after an inquiry has been made for it.

In addition, more popular inquiries will be updated more quickly than less popular ones. This streamlines better the performance of the network.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides devices, softwares and methods for preemptively updating expiring entries in a cache memory. This anticipates future inquiries for the entries, and time is not wasted in waiting for an update of an entry, after an inquiry has been made for it. The invention is now described in more detail.

Figure 1:
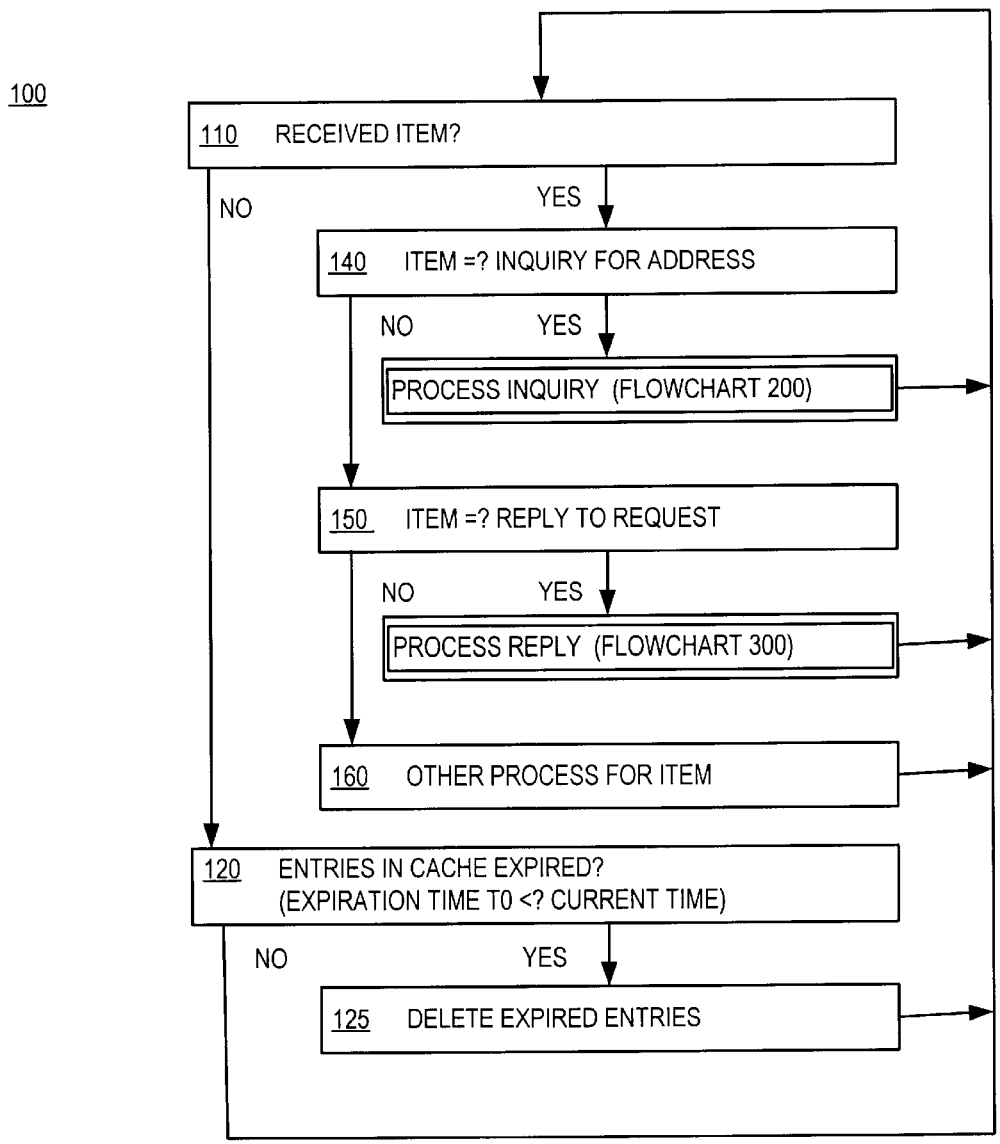
FIG. 1 is a flowchart illustrating a method of the prior art.
Figure 2:
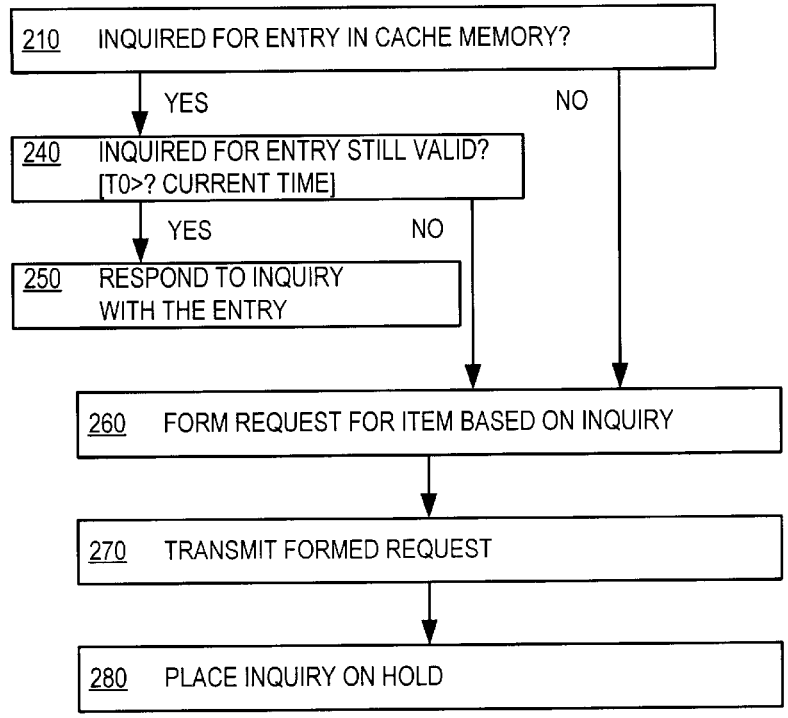
FIG. 2 is a flowchart illustrating an individual process in the method of FIG. 1.
Figure 3:
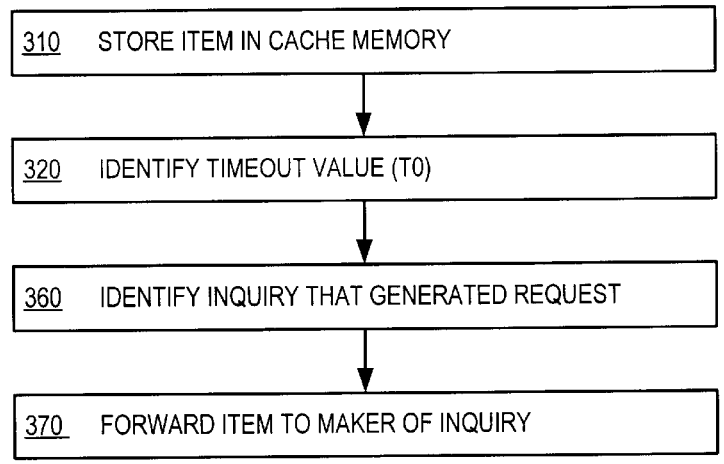
FIG. 3 is a flowchart illustrating another individual process in the method of FIG. 1.
Figure 4:
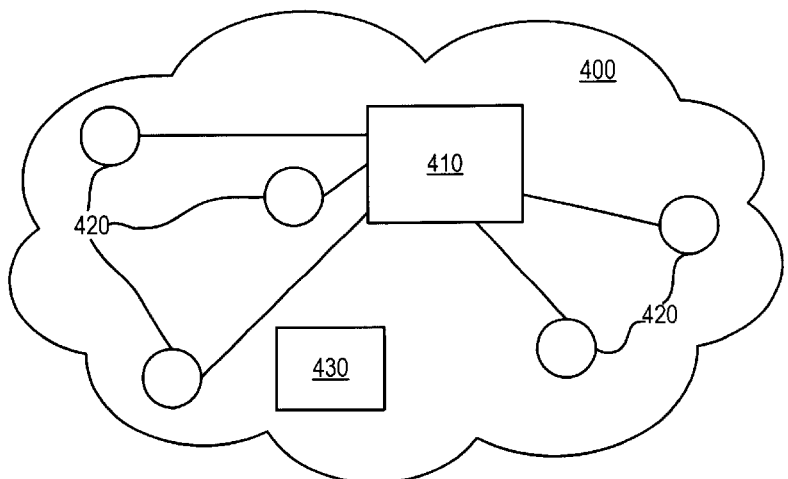
FIG. 4 is a network diagram showing an environment for a device made according to an embodiment of the invention.

Referring now to FIG. 4, a network 460 can be any communications network, such as the internet. A device 410 made according to an embodiment of the invention is situated in network 400, and may be in communication with other nodes 420 of network 400. Device 410 is also in communication with a back end server 430.

Figure 5:
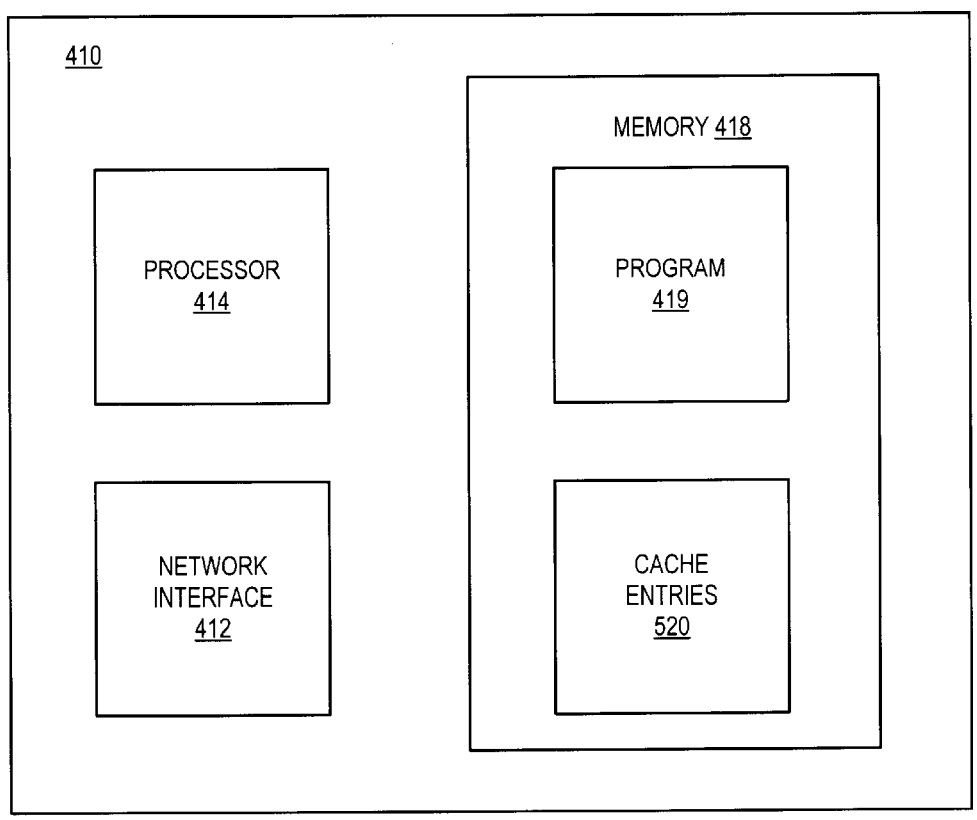
FIG. 5 is a block diagram of a device made according to an embodiment of the present invention.

Referring now to FIG. 5, device 410 of FIG. 4 is described in more detail. Device 410 may be any network switch, such as a router, a gateway, a bridge, etc.

Switch 410 has a network interface 412 for interfacing with a network, such as network 400.

Switch 410 also has a processor 414 coupled with network interface 412. Processor 414 may be implemented as a Digital Signal Processor (DSP), Central Processing Unit (CPU), or any other equivalent way known in the art.

Switch 410 additionally includes a memory 418, on which a program 419 may reside. Functions of processor 414 may be controlled by program 419, as will become apparent from the below.

Memory 418 also has a portion allocated for cache entries 520, and related data. These cache entries may be of any type, such as those of electronic addresses for other nodes 420 in network 400. Alternately, cache entries may be stored in another memory (not shown), which may be controlled by device 410.

Figure 6:
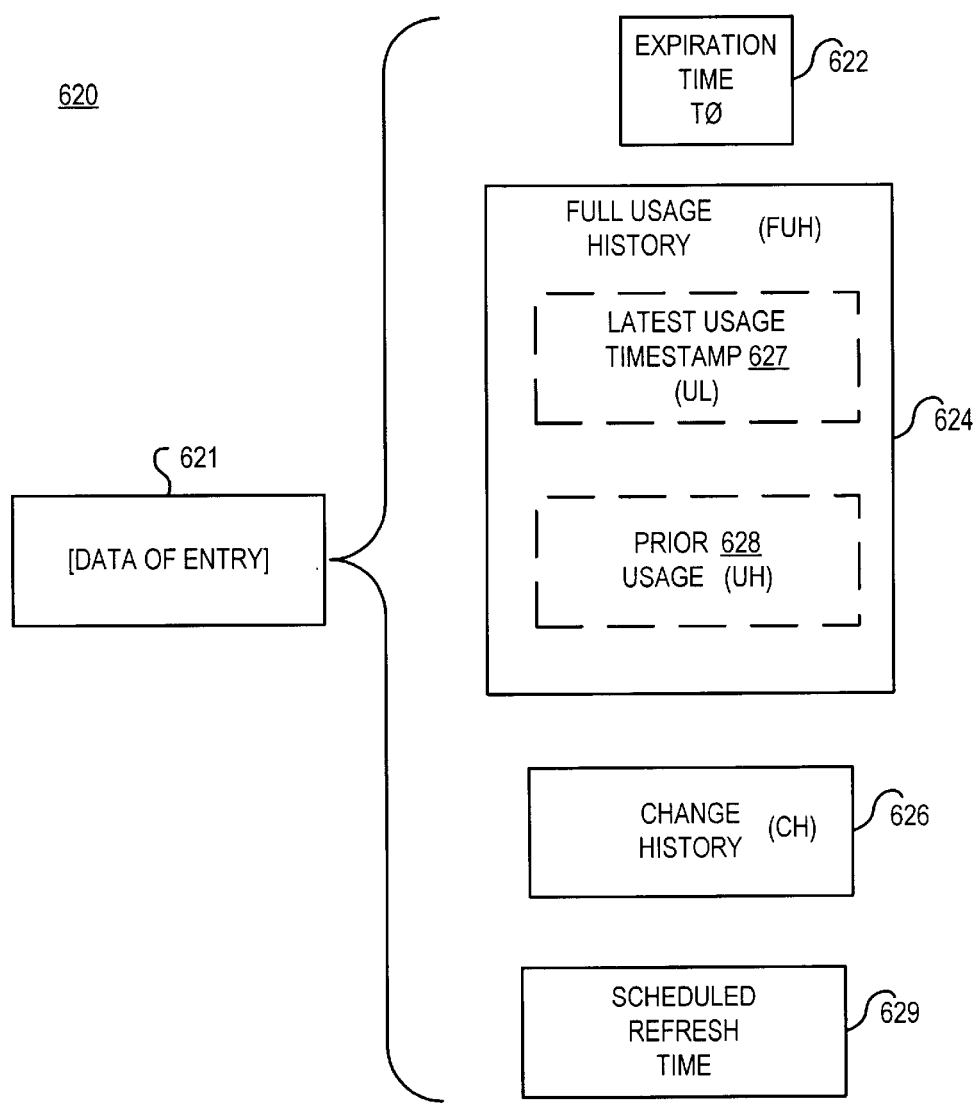
FIG. 6 is a block diagram illustrating a data structure according to an embodiment of the present invention.

Referring now to FIG. 6, a possible data structure 620 is illustrated for a single one of the entries 520 in the cache memory 418. Data structure 620 includes its own cache data 621, along with associated data groups 622, 624, 626, 627, 628, 629.

Data group 622 may be a value for the expiration time T0. It is determined as is known in the art.

Data group 624 may be data reflecting a usage history of the entry. It may have two components, namely a latest usage timestamp 627 and prior usage data 628.

Data group 626 may be data for a change history.

In addition, data group 629 may be a value for scheduled refresh time. This is computed as per the invention, preferably from both the usage history data 624 and change history data 626.

The present invention may be implemented by one or more devices that include logic circuitry. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between the method of the invention itself and the method of operating a computing machine. The present invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software and softwares. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

It will be appreciated that some of these methods may include software steps which may be performed by different modules of an overall parts of a software architecture. For example, data forwarding in a router may be performed in a data plane, which consults a local routing table. Collection of performance data may also be performed in a data plane. The performance data may be processed in a control plane, which accordingly may update the local routing table, in addition to neighboring ones. A person skilled in the art will discern which step is best performed in which plane.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described. It will be appreciated that some of these methods may include software steps which may be performed by different modules of an overall parts of a software architecture. For example, data forwarding in a router may be performed in a data plane, which consults a local routing table. Collection of performance data may also be performed in a data plane. The performance data may be processed, and accordingly used in a control plane to update the local routing table, in addition to neighboring ones. A person skilled in the art will discern which step is best performed in which plane.

Figure 7:
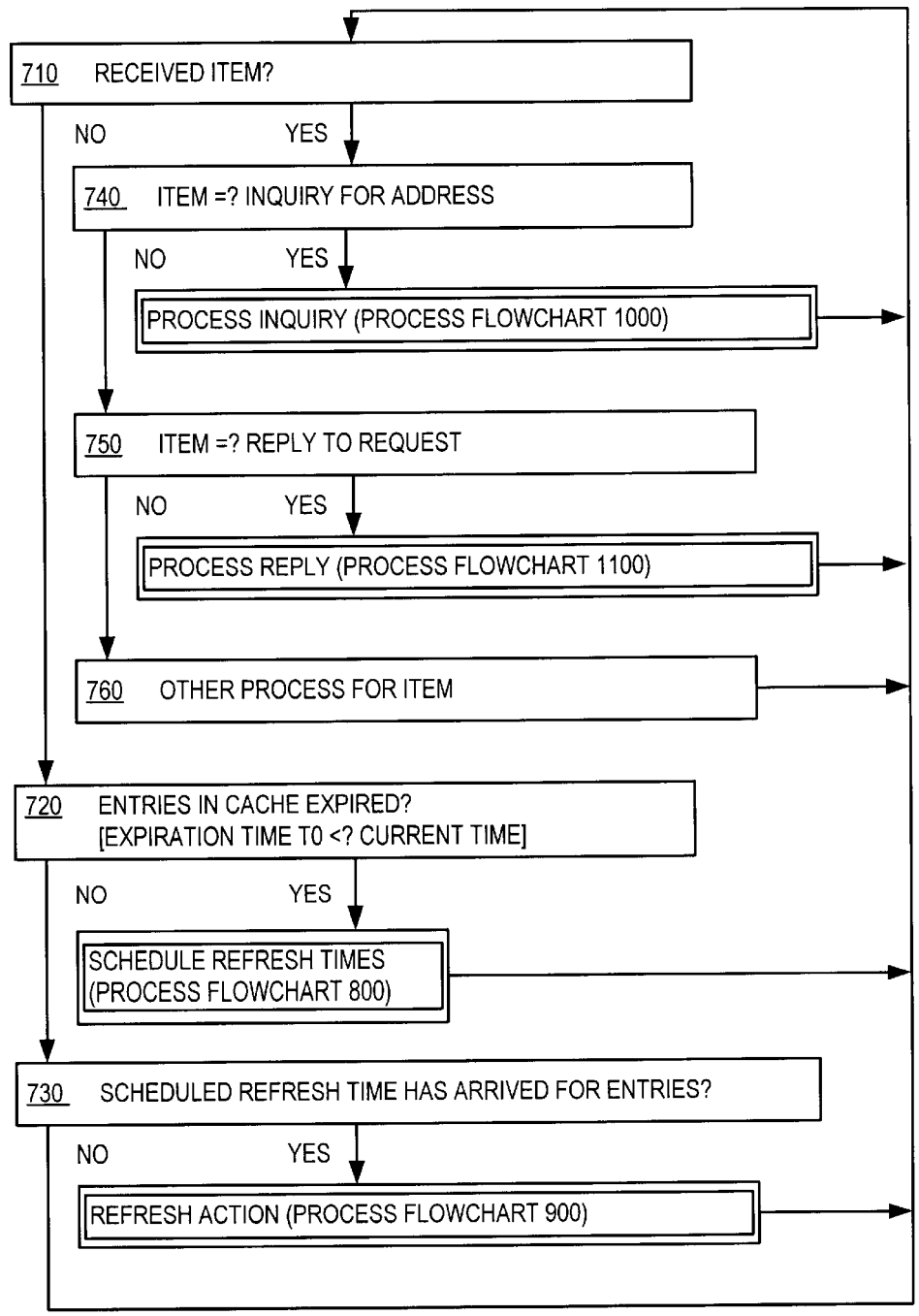
FIG. 7 is a flowchart illustrating a method according to an embodiment of the present invention.

Referring now to FIG. 7, a flowchart 700 is used to illustrate a method according to an embodiment of the invention. The method of flowchart 700 may also be practiced by device 410. It will be appreciated that flowchart 700 helps describe the method from an event-driven point of view.

According to a box 710, it is inquired whether an item is received. If not, then according to a next box 720, it is inquired whether any entries in a cache memory have expired. This would be known from data of box 622, i.e. if their expiration time T0 is less than the current time. If not, then according to a next box 730 it is inquired whether a scheduled refresh time has arrived for entries. This would be known by comparing data from box 629 with the current time. If not, then execution reverts to box 710. This completes the event driven process.

If at box 720 entries have expired, then a refresh time is scheduled. The scheduling is described in more detail later, with reference to flowchart 800 of FIG. 8. Execution may then revert to box 710.

If at box 730 a scheduled refresh time has arrived for entries, then a refresh action takes place. The refresh action is described in more detail later, with reference to flowchart 900 of FIG. 9. Execution may then revert to box 710.

If, at box 710, an item has indeed been received, then according to a next box 740, it is inquired whether the item is an inquiry for an address. If not, then according to a next box 750, it is inquired whether instead the item is a reply to a request. If not, then according to a next box 760, the item is processed otherwise, and execution reverts to box 710.

If, at box 740, the received item is indeed an inquiry for an address, then the inquiry is processed. Processing the inquiry according to the invention is described in more detail later, with reference to flowchart 1000 of FIG. 10. Execution may then revert to box 710.

If, at box 750, the received item is indeed a reply to a request, then the reply is processed. Processing the reply according to the invention is described in more detail later, with reference to flowchart 1100 of FIG. 11. Execution may then revert to box 710.

The method described above may be implemented in a number of equivalent ways. For example, the boxes may have a different sequence. In addition, instead of being in a loop, they may favor one the boxes, etc.

Individual event driven processes are now described of the above general method.

Figure 8:
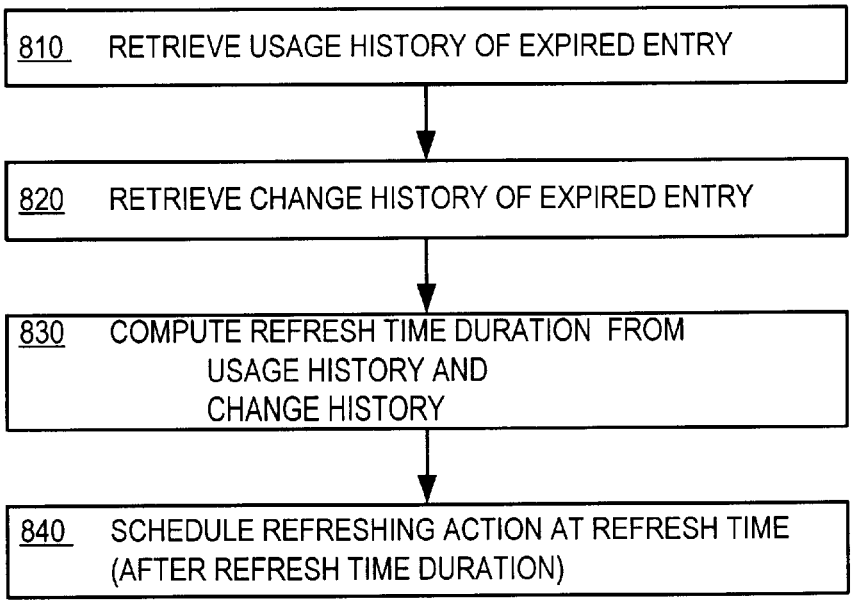
FIG. 8 is a flowchart illustrating an individual event driven process in the method of FIG. 7 according to an embodiment of the present invention.

Referring now to FIG. 8, a flowchart 800 is used to illustrate a scheduling method according to an embodiment of the invention.

According to an optional box 810, a full usage history fuh of the expired entry is retrieved. The full usage history fuh is the usage history by requests, maintained by data group 624. Full usage history fuh includes prior usage history uh (maintained by data group 628), and the most recent timestamp ul (maintained by data group 627).

According to an optional next box 820, a change history ch of the expired entry is retrieved. The change history is the history of past changes (maintained by data group 626).

According to a next box 830, a refresh time duration Trefr is computed. Preferably Trefr is computed from both the full usage history fuh and change history ch, although it can be from only one or the other. On other words, $$Trefr = f[fuf, ch]  \qquad \text{Equation (1)}$$

In addition, the value of the present time (timenow) may be used. Example computations for Trefr are:

$$Trefr = (ul + uh - \text{timenow}) + ch \qquad \text{Equation (2)}$$

$$Trefr = (ul + uh - \text{timenow})*(1 + 1/(1 + ch)) \qquad \text{Equation (3)}$$

According to a next box 840, a refreshing action is scheduled for the refresh time. The scheduled refresh time is found by adding the refresh time duration Trefr to the present time, and storing it in data group 629. This is the type of data that is retrieved at box 730 of FIG. 7.

Figure 9:
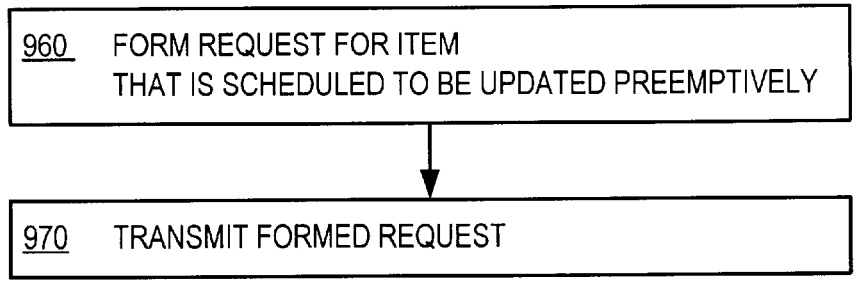
FIG. 9 is a flowchart illustrating another individual event driven process in the method of FIG. 7 according to another embodiment of the present invention.

Referring now to FIG. 9, a flowchart 900 is used to illustrate a preemptive refresh method according to an embodiment of the invention.

According to a box 960, a request is formed, for the item which is scheduled to be updated preemptively.

According to a next box 970, the formed request is transmitted.

It should be noted that the action of flowchart 900 is preemptive and proactive. It may take place when there is actually no pending inquiry for the item. This is a key difference from the prior art, where requests are formed reactively, not proactively.

Figure 10:
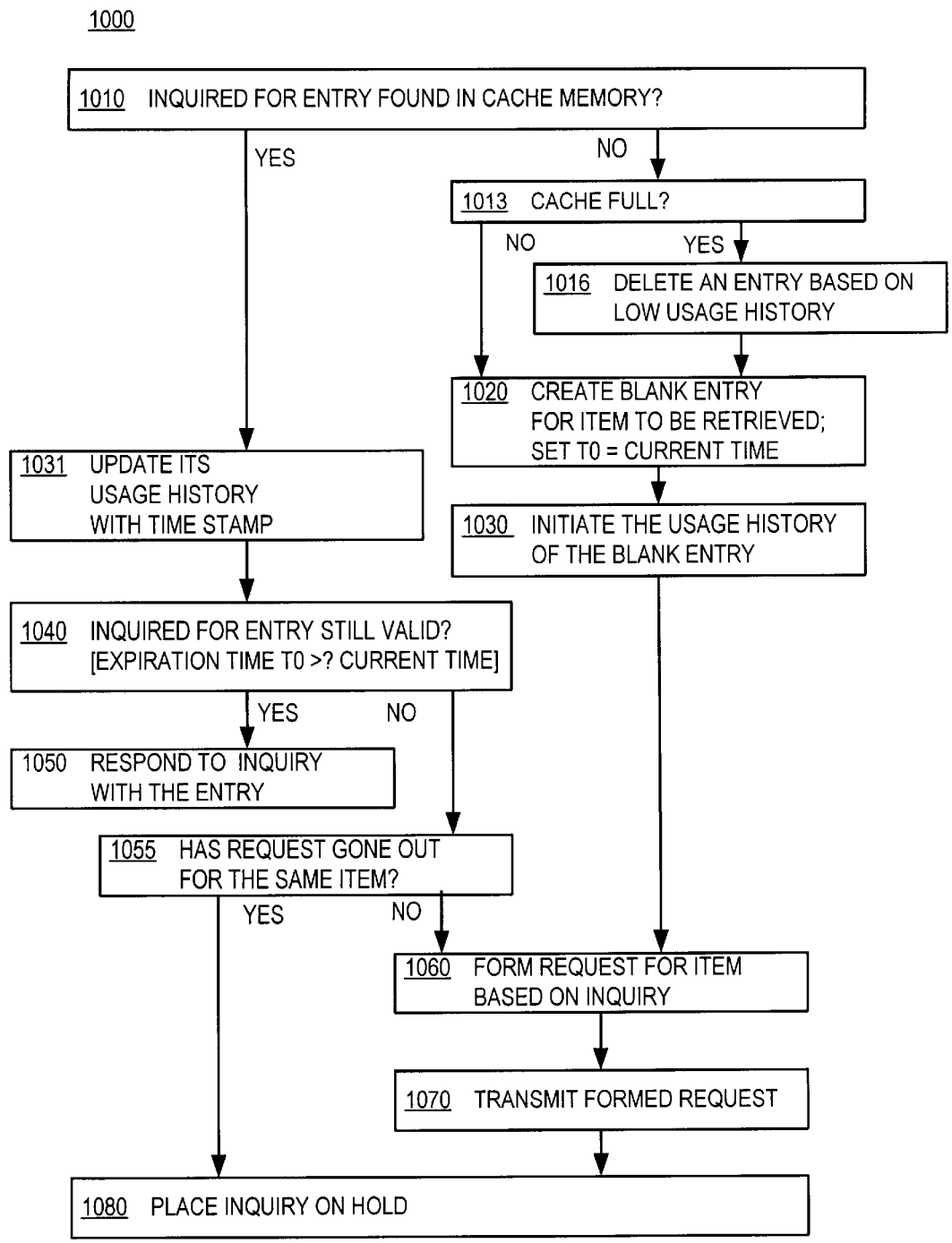
FIG. 10 is a flowchart illustrating another individual event driven process in the method of FIG. 7 according to another embodiment of the present invention.

Referring now to FIG. 10, a flowchart 1000 is used to illustrate an inquiry processing method according to an embodiment of the invention.

According to a box 1010, it is determined whether the inquired for entry is found in the cache memory.

If not, then according to a next box 1013, it is inquired if the cache is full. If not, then according to a next box 1016, one of the entries is deleted, based low usage history.

According to a next box 1020, a blank entry is created for the item to be retrieved. Its expiration time is initially set at a convenient default value T0=0. Then according to a next box 1030, a usage history is initiated for the blank entry.

If at box 1010 the entry is found in the cache memory, then according to a next box 1031, its usage history is updated. The update may be by incorporating the old value of ul into uh, and having ul assume the present value of the time stamp. This is a different process form that of box 1030, where a usage history was initiated for a blank entry.

Then according to a next box 1040, it is inquired whether the inquired for entry is still valid. This may be performed by determining whether the expiration time T0 is still larger than the current time. If yes, then according to a next box 1050, the inquiry is responded to, with the entry.

If at box 1040 the entry is no longer valid, it is possible that another inquiry has also been made for the same entry, and it has been placed on hold. In that case, it is desired to not send out a duplicate request. Accordingly, as per a next box 1055, it is inquired whether a request has gone out for the same item.

If a request has not gone out for the same item, or after box 1030, then according to a next box 1060, a request is formed for the item, based on the inquiry. Then according to a next box 1070, the formed request is transmitted.

According to a next box 1080, or if a request has gone out for the same item after box 1055, the inquiry is placed on hold.

It will be observed that the process of flowchart 1000 takes place while simultaneously initiating and/or maintaining a usage history for the entry.

Figure 11:
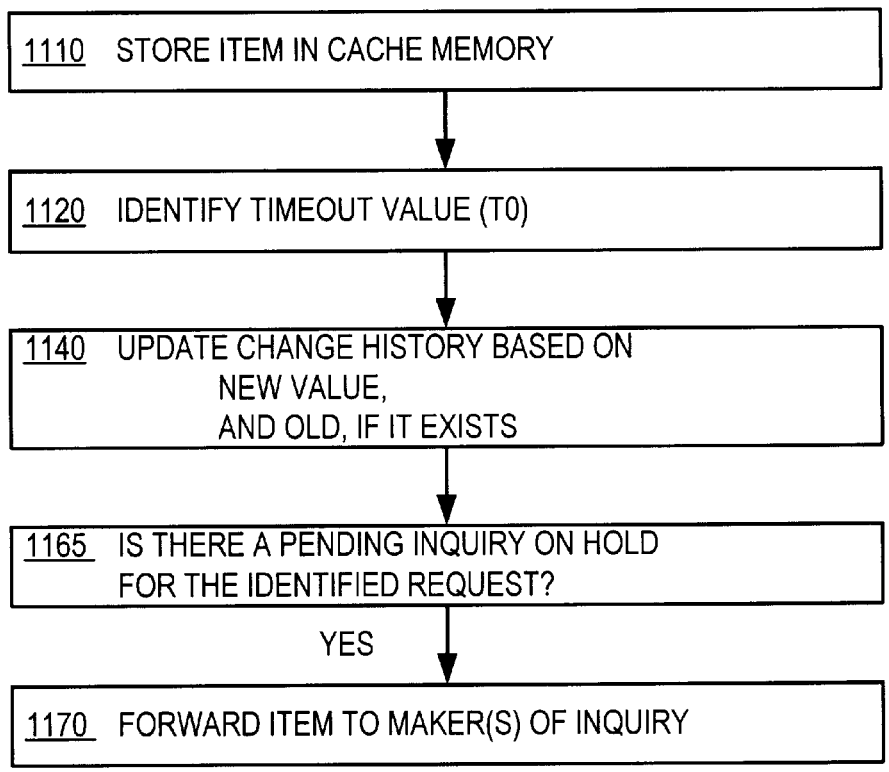
FIG. 11 is a flowchart illustrating another individual event driven process in the method of FIG. 7 according to another embodiment of the present invention.

Referring now to FIG. 11, a flowchart 1100 is used to illustrate a reply processing method according to an embodiment of the invention.

According to a box 1100, the received item is stored in the cache memory.

According to a next box 1120, its expiration time (timeout value) T0 is identified.

According to a next box 1140, its change history ch is updated. This may be based on the new value, and also the old if it is known.

As one example, the change history may be a moving average. It can have a value given by $$v\_new = y\_old * a + x * (1-a)$$ Equation (4)

In Equation (4), x, a can have suitable values, to produce a helpful result. It is found that a suitable value for a is between 0 and 1.

According to a next box 1165, it is inquired whether there is a pending inquiry on hold for the identified request? There may be more than one. Or there may be none, if the item was received merely in anticipation.

If yes, then according to a next box 1170, the item is forwarded to the makers of the inquiry.

It will be observed that the process of flowchart 1100 takes place while simultaneously initiating and/or maintaining a change history for the entry.

A peculiarity of the invention is that there is no direct provision for discarding entries, not even expired ones. Indeed, even when an entry expires, its usage history and change history are preserved.

The invention may be combined with methods where entries are discarded if there is an issue of lack of space in the memory. Even when that happens, the refreshing provisions are differentiated. Indeed, the more popular entries will be refreshed faster, and therefore they will be more likely to populate the cache memory.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A device comprising:
    a network interface for coupling to a network; and
    a processor coupled with the network interface, in which the processor is adapted to receive an inquiry;
        respond to the inquiry by forwarding a corresponding original entry;
        preserve the original entry in a cache memory; and
        determine a refresh time for requesting an update to the original entry
    according to a usage history and a change history of the original entry.

2. The device of claim 1 wherein the processor deletes entries in the cache according to cache fullness and the usage history of the cache entries.

3. The device of claim 1, in which
    the processor is further adapted to:
        determine an initially scheduled expiration time of the original entry, and
    in which the refresh time is re-computed when the initially scheduled expiration time occurs.

4. The device of claim 1, in which
    the processor is further adapted to:
        determine a latest response time of when the inquiry was responded to last, and in which the refresh time is determined from the latest response time.

5. The device of claim 1 wherein the usage history is determined according to prior usage history and a most recent time stamp value associated with the original entry.

6. The device of claim 1 wherein the processor updates the usage history by incorporating a previously used time stamp value into the usage history and then replacing the previously used time stamp value with a present time stamp value.

7. A device comprising:

means for receiving an inquiry;

means for responding to the inquiry by forwarding a corresponding original entry;

means for preserving the original entry in a cache memory; and means for transmitting a preemptive request to update the original entry in the cache without having to receive another inquiry that corresponds to the original entry and without requiring another inquiry corresponding to the original entry.

8. The device of claim 7, further comprising:

means for determining a refresh time duration for the original entry;

means for scheduling a refresh time from the determined refresh time duration; and means for transmitting the request to update when the scheduled refresh time occurs.

9. The device of claim 8, further comprising:

means for determining an initially scheduled expiration time of the original entry; and means for rescheduling the refresh time whenever the scheduled expiration time occurs for the original entry.

10. The device of claim 7 including deriving the refresh times for associated entries in the cache memory according to a prior usage history and a change history for the associated entries.

11. The device of claim 7 including means for deleting entries in the cache according to cache fullness and a usage history of the cache entries.

12. The device of claim 8, further comprising:

means for receiving an updated entry;

means for determining an extent to which the updated entry has changed from the original entry; and means for updating a change history in accordance with the extent, and in which the refresh time is determined from the updated change history.

13. An article comprising: a storage medium, the storage medium having instructions stored thereon, in which when the instructions are executed by at least one device, they result in:

receiving an inquiry;

responding to the inquiry by forwarding a corresponding original entry;

preserving the original entry in a cache memory; and transmitting a preemptive request to update the original entry in the cache without having to receive another inquiry that corresponds to the original entry and without requiring another inquiry corresponding to the original entry.

14. The article of claim 13, in which the instructions further result in:

determining a refresh time duration for the original entry;

scheduling a refresh time from the determined refresh time duration; and transmitting the request to update when the scheduled refresh time occurs.

15. The article of claim 14, in which the instructions further result in:

determining an initially scheduled expiration time of the original entry; and rescheduling the refresh time whenever the scheduled expiration time occurs for the original entry.

16. The article of claim 13 including deriving the refresh times for associated entries in the cache memory according to a prior usage history and a change history for the associated entries.

17. The article of claim 13 including deleting entries in the cache according to cache fullness and a usage history of the cache entries.

18. The article of claim 14, in which the instructions further result in:

receiving an updated entry;

determining an extent to which the updated entry has changed from the original entry; and updating a change history in accordance with the extent, and in which the refresh time is determined from the updated change history.

19. A method comprising:

receiving an inquiry;

responding to the inquiry by forwarding a corresponding original entry;

preserving the original entry in a cache memory; and transmitting a preemptive request to update the original entry in the cache without having to receive another inquiry that corresponds to the original entry and without requiring another inquiry corresponding to the original entry.

20. The method of claim 19, further comprising:

determining a refresh time duration for the original entry;

scheduling a refresh time from the determined refresh time duration; and transmitting the request to update when the scheduled refresh time occurs.

21. The method of claim 20, further comprising:

determining an initially scheduled expiration time of the original entry, and rescheduling the refresh time whenever the scheduled expiration time occurs for the original entry.

22. The method of claim 19 including deriving the refresh times for associated entries in the cache memory according to a prior usage history and a change history for the associated entries.

23. The method of claim 19 including deleting entries in the cache according to cache fullness and a usage history of the cache entries.

24. The method of claim 20, further comprising:

receiving an updated entry;

determining an extent to which the updated entry has changed from the original entry; and updating a change history in accordance with the extent, and in which the refresh time is determined from the updated change history.

* * * * *

UNITED STATES PATENT AND TRADEMARK OFFICE
CERTIFICATE OF CORRECTION

PATENT NO.   : 6,760,813 B1
DATED        : July 6, 2004
INVENTOR(S)  : Wu

It is certified that error appears in the above-identified patent and that said Letters Patent is hereby corrected as shown below:

Column 3,
Line 31, "network 460 can" should read -- network 400 can --.

Column 6,
Line 58, "Trefr = f[fuf,ch]" should read -- Trefr = f[fuh,ch] --.

Column 7,
Line 58, "box 1100, the" should read -- box 1110, the --.

Signed and Sealed this

Second Day of November, 2004

JON W. DUDAS
*Director of the United States Patent and Trademark Office*